United States Patent
Rud et al.

(10) Patent No.: US 11,226,242 B2
(45) Date of Patent: Jan. 18, 2022

(54) PROCESS TRANSMITTER ISOLATION COMPENSATION

(71) Applicant: Rosemount Inc., Shakopee, MN (US)

(72) Inventors: Jason Harold Rud, Mayer, MN (US); Steve Richard Trimble, Prior Lake, MN (US)

(73) Assignee: ROSEMOUNT INC., Shakopee, MN (US)

( * ) Notice: Subject to any disclaimer, the term of this patent is extended or adjusted under 35 U.S.C. 154(b) by 289 days.

(21) Appl. No.: 16/423,548

(22) Filed: May 28, 2019

(65) Prior Publication Data
US 2019/0293497 A1   Sep. 26, 2019

Related U.S. Application Data

(63) Continuation of application No. 15/437,731, filed on Feb. 21, 2017, now abandoned, and a
(Continued)

(51) Int. Cl.
*G01K 7/42* (2006.01)
*G01K 1/14* (2021.01)
*G01K 1/143* (2021.01)

(52) U.S. Cl.
CPC ............ *G01K 7/42* (2013.01); *G01K 1/143* (2013.01)

(58) Field of Classification Search
CPC .................................. G01K 7/42; G01K 1/143
See application file for complete search history.

(56) References Cited

U.S. PATENT DOCUMENTS 3,276,437 A   10/1966   Jonakin et al.
3,533,273 A   10/1970   Green
(Continued)

FOREIGN PATENT DOCUMENTS

CA   3 011 963      8/2017
CN   201589672      9/2010
(Continued)

OTHER PUBLICATIONS

Office Action from Chinese Patent Application No. 201611159645.5, dated Jul. 19, 2019.
(Continued)

*Primary Examiner* — Nathaniel T Woodward
*Assistant Examiner* — Philip L Cotey
(74) *Attorney, Agent, or Firm* — Westman, Champlin & Koehler, P.A.

(57) ABSTRACT

An industrial process temperature transmitter for measuring a temperature of a process medium includes a temperature sensing unit, a compensation circuit, an output circuit and a housing. The temperature sensing unit includes a process temperature sensor and a secondary temperature sensor. A temperature signal that is indicative of the temperature of the process medium is produced based on a process temperature signal output from the process temperature sensor and a secondary temperature signal output from the secondary temperature sensor. The compensation circuit compensates the temperature signal for a response time of the temperature measurement to a change in the temperature of the process medium, and outputs a compensated temperature signal. The output circuit produces a temperature output as a function of the compensated temperature signal. The housing is attached to an exterior of the process vessel and contains the secondary temperature sensor.

20 Claims, 6 Drawing Sheets

Related U.S. Application Data continuation-in-part of application No. 15/081,497, filed on Mar. 25, 2016, now Pat. No. 10,670,546, which is a continuation of application No. PCT/RU2016/000020, filed on Jan. 25, 2016.

(56) References Cited

U.S. PATENT DOCUMENTS

| | | | |
|---|---|---|---|
| 3,724,267 A | 4/1973 | Zoschak | |
| 4,096,575 A | 6/1978 | Itoh | |
| 4,186,605 A | 2/1980 | Bourigault | |
| 4,355,908 A | 10/1982 | Weisser et al. | |
| 4,384,793 A | 5/1983 | O'Brien | |
| 4,396,300 A | 8/1983 | Characklis et al. | |
| 4,415,279 A | 11/1983 | Beuse et al. | |
| 4,436,438 A | 3/1984 | Voznick | |
| 4,488,516 A | 12/1984 | Bueters et al. | |
| 4,527,908 A | 7/1985 | Arisi | |
| 4,722,609 A | 2/1988 | Epstein et al. | |
| 4,722,610 A | 2/1988 | Levert et al. | |
| 4,826,540 A | 5/1989 | Mele | |
| 4,968,151 A | 11/1990 | Thomson | |
| 5,064,604 A | 11/1991 | Barton | |
| 5,233,868 A | 8/1993 | Coats et al. | |
| 5,495,769 A * | 3/1996 | Broden | G08C 19/02 |
| | | | 73/718 |
| 5,743,646 A | 4/1998 | O'Connell et al. | |
| 5,920,617 A | 7/1999 | Berger et al. | |
| 5,980,102 A | 11/1999 | Stulen et al. | |
| 6,295,875 B1 | 10/2001 | Frick et al. | |
| 6,367,970 B1 | 4/2002 | Danielson | |
| 6,473,710 B1 * | 10/2002 | Eryurek | G08C 19/02 |
| | | | 374/183 |
| 6,485,174 B1 | 11/2002 | Albrecht et al. | |
| 6,503,221 B1 | 1/2003 | Briggs et al. | |
| 6,662,662 B1 | 12/2003 | Nord et al. | |
| 6,681,625 B1 | 1/2004 | Berkcan et al. | |
| 6,725,731 B2 | 4/2004 | Wiklund et al. | |
| 6,824,305 B1 | 11/2004 | Boyd et al. | |
| 6,848,373 B2 | 2/2005 | Breen et al. | |
| 6,883,369 B1 | 4/2005 | Myhre | |
| 6,983,586 B2 | 1/2006 | Tangirala et al. | |
| 7,036,381 B2 | 5/2006 | Broden et al. | |
| 7,220,050 B2 | 5/2007 | Esprimont et al. | |
| 7,249,883 B2 | 7/2007 | Kuroda et al. | |
| 7,249,885 B2 | 7/2007 | Van Den Ende et al. | |
| 7,258,021 B2 | 8/2007 | Broden | |
| 7,395,173 B2 | 7/2008 | Kautz et al. | |
| 7,447,607 B2 | 11/2008 | Schuh et al. | |
| 7,624,632 B1 | 12/2009 | Hoyle et al. | |
| 7,789,554 B2 | 9/2010 | Sattler et al. | |
| 8,033,175 B2 | 10/2011 | Sundet et al. | |
| 8,057,093 B2 | 11/2011 | Sattler | |
| 8,092,085 B2 | 1/2012 | Kawase et al. | |
| 8,280,674 B2 | 10/2012 | Schwerer et al. | |
| 8,301,408 B2 | 10/2012 | Howe | |
| 8,591,102 B2 | 11/2013 | Frach et al. | |
| 8,596,113 B2 | 12/2013 | Matsumoto et al. | |
| 8,671,890 B2 | 3/2014 | Davidson | |
| 8,851,745 B2 | 10/2014 | Sakami | |
| 8,924,190 B2 | 12/2014 | Djelassi | |
| 9,157,763 B2 | 10/2015 | Schulte et al. | |
| 9,188,490 B2 | 11/2015 | Perrault et al. | |
| 9,360,377 B2 | 6/2016 | Converse | |
| 9,588,003 B2 | 3/2017 | Hedtke et al. | |
| 9,970,828 B2 | 5/2018 | Ude | |
| 10,234,338 B2 | 3/2019 | Rieder et al. | |
| 2004/0079341 A1 | 4/2004 | Fuwa | |
| 2004/0163969 A1 | 8/2004 | Breen et al. | |
| 2005/0114068 A1 | 5/2005 | Chey et al. | |
| 2005/0209813 A1 * | 9/2005 | Kautz | G01K 17/20 |
| | | | 702/130 |
| 2005/0217841 A1 | 10/2005 | Van Den Ende et al. | |
| 2006/0050767 A1 | 3/2006 | Fleming | |
| 2008/0053242 A1 | 3/2008 | Schumacher | |
| 2008/0083446 A1 | 4/2008 | Chakraborty et al. | |
| 2009/0110023 A1 | 4/2009 | Clark, Jr. et al. | |
| 2009/0196374 A1 * | 8/2009 | Schulte | G01D 3/08 |
| | | | 375/296 |
| 2009/0293625 A1 * | 12/2009 | Sundet | G01L 9/125 |
| | | | 73/708 |
| 2010/0064816 A1 | 3/2010 | Filippi | |
| 2010/0111133 A1 | 5/2010 | Yahas et al. | |
| 2010/0246630 A1 | 9/2010 | Kaszynski et al. | |
| 2010/0257871 A1 | 10/2010 | Venkatasubramanian et al. | |
| 2010/0316086 A1 | 12/2010 | Engelstad et al. | |
| 2011/0054822 A1 | 3/2011 | Bauschke et al. | |
| 2011/0119018 A1 * | 5/2011 | Skarp | G01K 7/42 |
| | | | 702/130 |
| 2011/0191059 A1 * | 8/2011 | Farrell | A61B 5/14532 |
| | | | 702/130 |
| 2011/0238351 A1 | 9/2011 | Djelassi | |
| 2012/0067542 A1 | 3/2012 | Frach et al. | |
| 2012/0109572 A1 | 5/2012 | Shimizu | |
| 2012/0128024 A1 | 5/2012 | Tsuchida et al. | |
| 2013/0325381 A1 | 12/2013 | Varnak et al. | |
| 2013/0333440 A1 | 12/2013 | Hedtke | |
| 2014/0161151 A1 | 6/2014 | Proctor et al. | |
| 2014/0348205 A1 | 11/2014 | Shaw et al. | |
| 2015/0082892 A1 | 3/2015 | Hedtke et al. | |
| 2015/0185085 A1 | 7/2015 | Converse | |
| 2015/0204733 A1 * | 7/2015 | Newell | G01K 7/16 |
| | | | 374/141 |
| 2016/0091383 A1 | 3/2016 | Hoffman | |
| 2016/0178446 A1 | 6/2016 | Ude | |
| 2017/0074730 A1 | 3/2017 | Rieder et al. | |
| 2017/0184456 A1 | 6/2017 | Chatterjee | |
| 2017/0212065 A1 | 7/2017 | Rud et al. | |
| 2017/0269015 A1 | 9/2017 | Gunther et al. | |
| 2018/0087987 A1 | 3/2018 | Rodeheffer | |
| 2018/0128688 A1 * | 5/2018 | Newell | G01K 1/14 |
| 2018/0238741 A1 | 8/2018 | Rud et al. | |

FOREIGN PATENT DOCUMENTS

| | | |
|---|---|---|
| CN | 103512630 | 1/2014 |
| CN | 203758647 | 8/2014 |
| CN | 104062034 | 9/2014 |
| CN | 104515643 | 4/2015 |
| CN | 105043570 | 11/2015 |
| CN | 105716733 | 6/2016 |
| CN | 105784149 | 7/2016 |
| DE | 3803104 A | 8/1989 |
| DE | 199 39 757 | 2/2001 |
| DE | 10 2007 055029 | 8/2009 |
| DE | 102007055029 A1 | 8/2009 |
| EP | 0908712 A1 | 4/1999 |
| FR | 2724727 A1 | 3/1996 |
| GB | 2 500 034 | 9/2013 |
| JP | 2004-279311 | 10/2004 |
| JP | 2004-357426 | 12/2004 |
| JP | 2005-171984 | 6/2005 |
| JP | 2006-249715 | 9/2006 |
| JP | 2011-027619 | 2/2011 |
| JP | 2011-511382 | 4/2011 |
| RU | 98240 U1 | 10/2010 |
| RU | 2453931 | 6/2012 |
| RU | 2466365 C1 | 11/2012 |
| UA | 37415 U | 11/2008 |
| WO | WO 91/14161 | 9/1991 |
| WO | WO 01/84101 A2 | 11/2001 |
| WO | 2009154586 A1 | 12/2009 |
| WO | 2010067009 A1 | 6/2010 |
| WO | WO 2013/132239 | 9/2013 |
| WO | WO 2014/037257 A2 | 3/2014 |
| WO | WO 2014/052140 | 4/2014 |
| WO | WO 2015/135739 | 9/2015 |

OTHER PUBLICATIONS

Examination Report from Australian Patent Application No. 2017337325, dated Aug. 12, 2019.

(56) References Cited

OTHER PUBLICATIONS

Examination Report from Australian Patent Application No. 2017337325, dated Aug. 13, 2019.
Rosemount 644 Temperature Transmitter Reference Manual 00809-0200-4728 (Year: 2012).
Rosemount 644 Temperature Transmitter Product Data Sheet 00809-0200-4728 (Year: 2010).
Prosecution History from U.S. Appl. No. 15/279,609 including Non-Final Rejection dated Apr. 30, 2019; Final Rejection dated Jan. 15, 2019 and Non-Final Rejection dated Aug. 29, 2018.
International Search Report and Written Opinion of PCT/US2017/039202, dated Sep. 11, 2017.
International Search Report and Written Opinion of PCT/US2018/017937, dated Apr. 17, 2018.
Prosecution History from U.S. Appl. No. 15/081,497 including Non-Final Rejection dated Mar. 4, 2019 and Non-Final Rejection dated Aug. 9, 2018.
International Search Report and Written Opinion of PCT/RU2016/000020, dated Oct. 27, 2016.
Product Sheet 00813-0100-4952, Rev BA, Rosemount Pipe Clamp RTD Sensor, Emerson Process Management, Dec. 2010.
International Search Report and Written Opinion of PCT/US2014/067243, dated Feb. 27, 2015, 10 pages.
First Office Action dated Nov. 27, 2018, for Chinese Patent Application No. 201680000355.8, 17 pages including English translation.
Prosecution History from U.S. Appl. No. 15/437,731 including Final Rejection dated Feb. 26, 2019 and Non-Final Rejection dated Aug. 16, 2018.
Communication from European Patent Application No. 17735348.9, dated Mar. 20, 2019.
Copy of Office Action from Chinese Patent Application No. 201710387443.4, dated Jun. 20, 2019.
Office Action from U.S. Appl. No. 15/279,609, dated Oct. 10, 2019.
Office Action from Russian Patent Application No. 2019112678/28, dated Sep. 20, 2019.
Communication from European Patent Application No. 18707531.2, dated Oct. 7, 2019.
Examination Report No. 1 from Australian Patent Application No. 2018224018, dated Apr. 9, 2020.
Search Report from Russian Application No. 2019129543, dated Feb. 11, 2020, 4 pages.
Examination Report from Indian Patent Application No. 201927007237, dated Nov. 19, 2020.
Office Action from Canadian Patent Application No. 3,053,768, dated Sep. 8, 2020.
Examination Report No. 2 from Australian Patent Application No. 2016389707, dated May 22, 2019.
Office Action from Canadian Patent Application No. 3,011,963, dated May 31, 2019.
Russian Search Report from Russian Patent Application No. 2018130672, dated Mar. 11, 2019.
Office Action from Japanese Patent Application No. 2018-538684, dated Sep. 3, 2019.
Office Action from European Patent Application No. 16888329.6, dated Sep. 4, 2019.
Office Action from Chinese Patent Application No. 201680000355.8, dated Sep. 18, 2019.
Examination Report No. 3 from Australian Patent Application No. 2016389707, dated Oct. 4, 2019.
Examination Report No. 4 from Australian Patent Application No. 2016389707, dated Jan. 10, 2020.
Office Action from Chinese Patent Application No. 201680000355.8, dated Mar. 12, 2020.
Office Action from Chinese Patent Application No. 201611159645.5, dated May 7, 2020.
Examination Report No. 3 from Australian Patent Application No. 2017337325, dated Mar. 19, 2020.
Office Action from Chinese Patent Application No. 201710387443.4, dated Mar. 19, 2021.
Examination Report from Indian Patent Application No. 201927032782, dated Feb. 26, 2021.
Office Action from U.S. Appl. No. 15/279,609, dated Jan. 21, 2021.
Office Action from Chinese Patent Application No. 201710387443.4, dated Oct. 10, 2020.
Examination Report No. 2 from Australian Patent Application No. 2018224018, dated Sep. 18, 2020.
Office Action from Japanese Patent Application No. 2019-566568, dated Sep. 18, 2020, with English translation of "Outline of Office Action".
Examination Report No. 3 from Australian Application No. 2017337325, dated Mar. 19, 2020.
Office Action from Chinese Application No. 201611159645.5, dated May 7, 2020.
Office Action from European Application No. 18707531.2, dated Oct. 7, 2019.
Office Action from U.S. Appl. No. 15/279,609, dated Aug. 13, 2020.
Office Action from U.S. Appl. No. 15/279,609, dated Nov. 21, 2019.
Office Action from U.S. Appl. No. 15/081,497, dated Oct. 11, 2019.
Office Action from Chinese Patent Application No. 201710387443.4, dated Mar. 16, 2020.
Office Action from Japanese Patent Application No. 2019-566568, dated Apr. 6, 2021.
Office Action from Canadian Patent Application No. 3,053,768, dated Jul. 2, 2021.
Office Action from Chinese Patent Application No. 201710387443.4, dated Aug. 6, 2021.
Communication Pursuant to 94(3) EPC from European Patent Application No. 17735348.9, dated Aug. 10, 2021.
Office Action from Japanese Patent Application No. 2019-566568, dated Aug. 24, 2021.
Communication Pursuant to Article 94(3) EPC from European Patent Application No. 18707531.2, dated Nov. 8, 2021.

* cited by examiner

PROCESS TRANSMITTER ISOLATION COMPENSATION

CROSS-REFERENCE TO RELATED APPLICATION

The present application is a continuation of U.S. patent application Ser. No. 15/437,731, filed Feb. 21, 2017, and is a continuation-in-part of U.S. patent application Ser. No. 15/081,497, filed Mar. 25, 2016, which is a continuation of PCT/RU2016/000020, filed Jan. 25, 2016, the contents of which are hereby incorporated by reference in their entirety.

FIELD

Embodiments of the present disclosure relate to industrial process temperature transmitters and, more specifically, to compensating temperature measurements performed by the temperature transmitter for a response time of the temperature measurement.

BACKGROUND

Industrial processes are used in the manufacturing and transport of many types of materials. In such systems, it is often required to measure different parameters within the process. One such parameter is a temperature of the process medium.

Industrial process temperature transmitters typically measure the temperature of the process medium using a temperature sensor and communicate the measured temperature to a desired location, such as a control room. Such temperature transmitters typically isolate the temperature sensor from the process medium to protect the temperature sensor and associated electronics from process conditions that may damage the sensor, and/or adversely affect the temperature measurement.

Some temperature transmitters house the temperature sensor within a thermowell. The temperature sensor is installed in the thermowell through an open end. A sealed end of the thermowell is inserted into the process medium. This allows the temperature sensor to measure the temperature of the process medium through the thermowell without being directly exposed to the process medium. Thus, the temperature sensor may be inserted into the process medium while providing protection from harsh conditions that could damage the sensor.

Other temperature transmitters measure the temperature of the process medium while avoiding any intrusion on the process. Such non-intrusive temperature transmitters typically position a temperature sensor in contact with the exterior surface of a process vessel wall containing the process medium, such as the exterior surface of a pipe containing the process medium. The temperature sensor measures the temperature of the process medium through the process vessel wall.

Temperature transmitters experience a delay in the detection of a change in the temperature of the process medium that is caused, at least in part, to the need to communicate the temperature through the wall of the thermowell or the wall of the process vessel. For some applications, such as those where temperature measurement timing is critical for process management, such a delay in the temperature measurement may be unacceptable.

SUMMARY

Embodiments of the present disclosure relate to industrial process temperature transmitters for measuring a temperature of a process medium, and methods for measuring a temperature of a process medium using an industrial process temperature transmitter. Some embodiments of the temperature transmitter include a temperature sensing unit, a compensation circuit, an output circuit and a housing. The temperature sensing unit includes a process temperature sensor that is separated from the process medium by an isolation wall, and a secondary temperature sensor that is configured to produce a secondary temperature signal based on a sensed temperature. The temperature sensing unit is configured to produce a temperature signal that is indicative of the temperature of the process medium based on a process temperature signal output from the process temperature sensor and the secondary temperature signal during a temperature measurement. The compensation circuit is configured to compensate the temperature signal for a response time of the temperature measurement to a change in the temperature of the process medium, and output a compensated temperature signal. The output circuit is configured to produce a temperature output as a function of the compensated temperature signal corresponding to the temperature of the process medium. The housing is attached to an exterior of the process vessel and contains the secondary temperature sensor.

In some embodiments of the method, a temperature measurement of a temperature of a process medium is performed using a temperature sensing unit including sensing the temperature of the process medium through an isolation wall using a process temperature sensor comprising a thermistor, and sensing a temperature of a terminal block of the transmitter using a secondary temperature sensor. A temperature signal is produced in response to the temperature measurement by processing a process temperature signal from the process temperature sensor and a secondary temperature signal from the secondary temperature sensor. The temperature signal is compensated for a response time of the temperature measurement and a compensated temperature signal is generated, in which the response time of the temperature measurement is reduced or eliminated, using a compensation circuit. A temperature output is produced as a function of the compensated temperature signal using an output circuit of the transmitter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
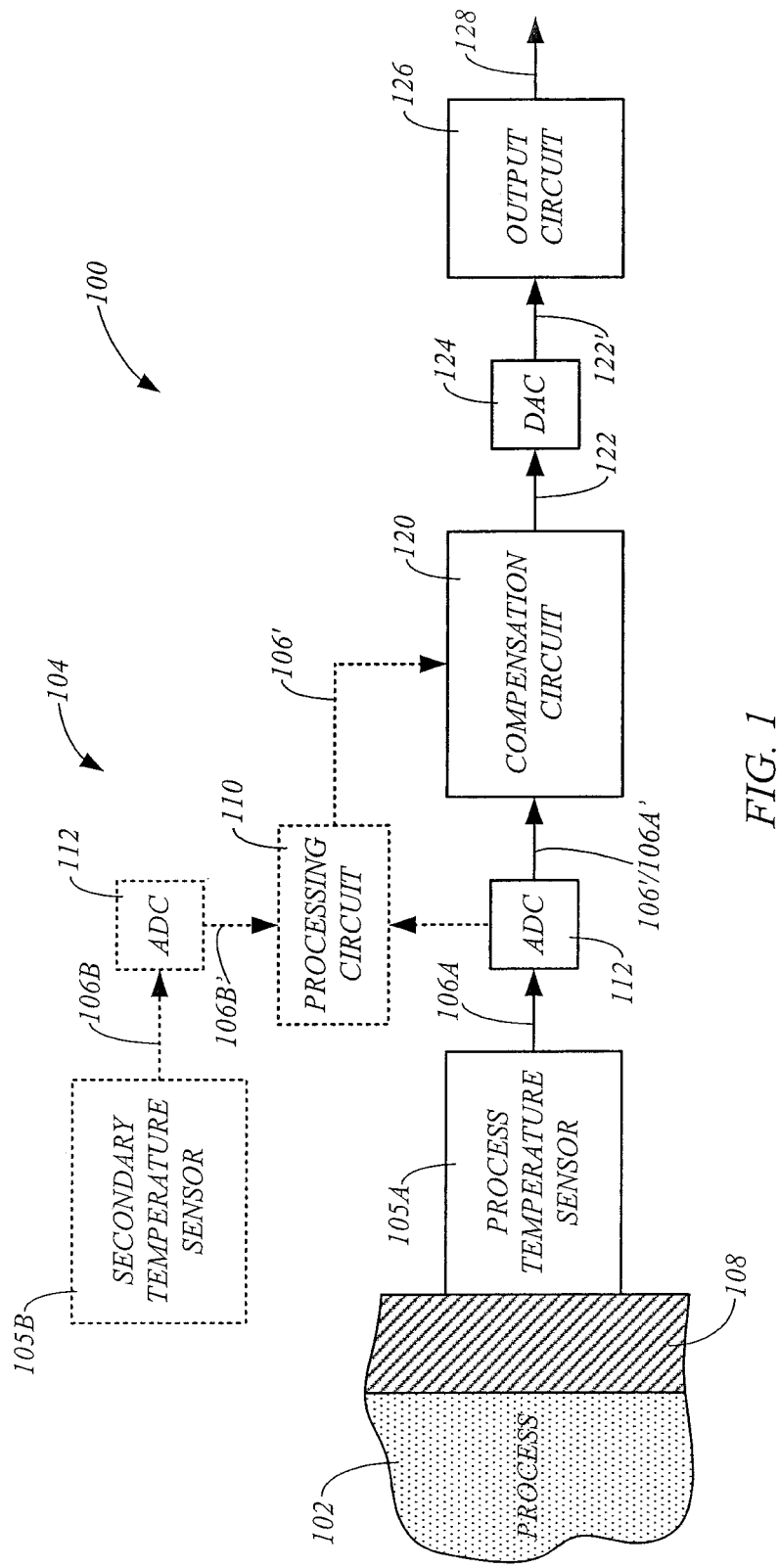
FIG. 1 is a simplified block diagram of an industrial process temperature transmitter, in accordance with one or more embodiments of the present disclosure, interacting with a process.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings, or attachments between elements also include embodiments, in which the elements are indirectly connected, coupled, or attached to each other.

It will be understood that, although the terms first, second, etc. may be used herein to describe various elements, these elements should not be limited by these terms. These terms are only used to distinguish one element from another. Thus, a first element could be termed a second element without departing from the teachings of the present disclosure.

Unless otherwise defined, all terms (including technical and scientific terms) used herein have the same meaning as commonly understood by one of ordinary skill in the art relating to the present disclosure. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present disclosure may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

Embodiments of the present disclosure are directed to compensating industrial temperature transmitter temperature measurements to improve the response time of the temperature measurements. This is generally accomplished by compensating a temperature signal produced by a temperature sensor that is a function of the temperature of a process medium for delays in the temperature measurements relating to the separation of the temperature sensor from the process medium by an isolation wall, and other factors. The improved response time of the temperature transmitter can improve the efficiency of the process, and allows the temperature transmitter to preferably be used in processes where high speed temperature measurements are desired.

FIG. 1 is a simplified block diagram of an industrial temperature transmitter, generally referred to as 100, formed in accordance with one or more embodiments of the present disclosure, interacting with a process medium 102. In some embodiments, the process medium 102 includes an industrial process that involves a material, such as a fluid, moving through pipes and tanks to transform less valuable materials into more valuable and useful products, such as petroleum, chemicals, paper, food, etc. For example, an oil refinery performs industrial processes that can process crude oil into gasoline, fuel oil, and other petrochemicals. Industrial process control systems use process devices, such as process transmitters, as measurement instruments for sensing and measuring process parameters, such as pressure, flow, temperature, level, and other parameters, in combination with, for example, control devices, such as valves, pumps and motors, to control the flow of materials during their processing.

In some embodiments, the temperature transmitter 100 includes a temperature sensing unit 104 that is configured to sense a temperature of the process medium 102 and output a measured temperature signal, generally referred to as 106, that is indicative of the temperature of the process medium 102. In some embodiments, the unit 104 includes one or more temperature sensors, generally referred to as 105, that are used to measure a temperature of the process medium 102. The one or more temperature sensors 105 may take on any suitable form. For example, the sensors 105 may each include a thermocouple, a resistive temperature detector, a thermistor, and/or another suitable temperature sensing device.

In some embodiments, the unit 104 includes at least one process temperature sensor 105A (hereinafter "temperature sensor 105A") that is separated from the process medium 102 by an isolation wall 108 that engages the process medium 102 and isolates the sensor 105A from the process medium 102. As discussed below, the isolation wall 108 may be a component of the temperature transmitter 100 (e.g., a wall of a thermowell), or a wall of a process vessel (e.g., a pipe, a tank, etc.) containing the process medium 102, for example. In some embodiments, the isolation wall 108 is a sheath or wall of the temperature sensor 105A or other housing. The sensor 105A is configured to produce a temperature signal 106A that is a function of the temperature of the process medium 102 that is communicated through the wall 108. In some embodiments, the temperature signal 106 is produced by the unit 104 using only the temperature signal 106A produced by the one or more process temperature sensors 105A, such as when the temperature transmitter 100 uses a thermowell, as discussed below.

In some embodiments, temperature sensing unit 104 includes one or more secondary temperature sensors 105B (hereinafter "secondary temperature sensor 105B") and a processing circuit 110, which are illustrated in phantom lines. The processing circuit 110 may comprise analog circuitry and/or digital circuitry. In some embodiments, the processing circuit 110 represents one or more processors that are configured to execute instructions, which may be stored locally in memory of the processing circuit 110, or in memory that is remote to the transmitter 100, to perform one or more functions described herein.

The temperature sensor 105B is configured to output a temperature signal 106B that is processed along with the temperature signal 106A by the processing circuit 110 to estimate the temperature of the process medium 102. In some embodiments, the temperature signal 106B may be indicative of the ambient conditions to which the isolation wall 108 and/or another component of the transmitter 100 is exposed. In some embodiments, the processing circuit 110 processes the temperature signals 106A and 106B to produce the temperature signal 106 representing the temperature measured by the unit 104. Typically, the secondary temperature sensor 105B and the processing circuit 110 are used with non-intrusive temperature transmitters 100, as discussed below.

In some embodiments, the transmitter 100 is an analog device, in which the temperature signals 106, 106A, and/or 106B (if present) are analog signals. In some embodiments, the temperature transmitter 100 includes one or more analog-to-digital converters (ADC) 112 that digitizes the analog temperature signals into a digital temperature signal (e.g., 106', 106A', 106B') for processing by circuitry of the transmitter in the digital domain, as illustrated in FIG. 1. In some embodiments, separate ADC's 112 are used, as shown in FIG. 1. In some embodiments, a single ADC 112 may be used with the input signals (e.g., 106A and 106B) multiplexed into it.

The communication of the temperature of the process medium 102 through the isolation wall 108 delays the communication of a temperature change in the medium 102 to the temperature sensor 105A. As a result, a period of time must elapse before the temperature change of the medium 102 is measured by the sensor 105A and the measured temperature represented by the temperature signal 106 indicates the temperature change. This delay in the temperature measurement corresponds to a response time of the temperature measurement, which may be dependent on one or more variables, such as the material forming the isolation wall 108, the thickness of the isolation wall 108, the mass of the isolation wall 108, the thermal conductivity of the isolation wall 108, an ambient temperature to which the isolation wall 108 is exposed, and/or other variables.

Effects of the delay in the temperature measurement of the process medium 102 include a limit on the measurement bandwidth. Specifically, the delay acts as a low-pass filter whose cutoff frequency drops in response to an increase in the delay or a decrease in the response time. As a result, changes in the temperature of the process medium 102 occurring at a frequency that is above the cutoff frequency are rendered undetectable by the temperature sensing unit 104. Embodiments of the present disclosure operate to reduce or eliminate the temperature measurement delay by reducing the "perceived" response time of the temperature measurement or by reducing the impact of the response time of the temperature measurement, thereby decreasing the cutoff frequency and the loss of potentially valuable information.

In some embodiments, the temperature transmitter 100 includes a compensation circuit 120 that is configured to process the temperature signal 106 output by the temperature sensing unit 104 to compensate the temperature signal 106 or the temperature measurement indicated by the temperature signal 106 for the response time of the temperature measurement, and output a compensated temperature signal 122 that more accurately represents the current temperature of the process medium 102. Thus, in some embodiments, the compensation circuit 120 compensates the temperature signal 106 that is produced based on the temperature signal 106A output from the process temperature sensor 105A. In other embodiments, the compensation circuit 120 compensates the temperature signal 106 output by the processing circuit 110, which is based on the temperature signal 106A output from the temperature sensor 105A and the temperature signal 106B output from the temperature sensor 105B.

Figure 2:
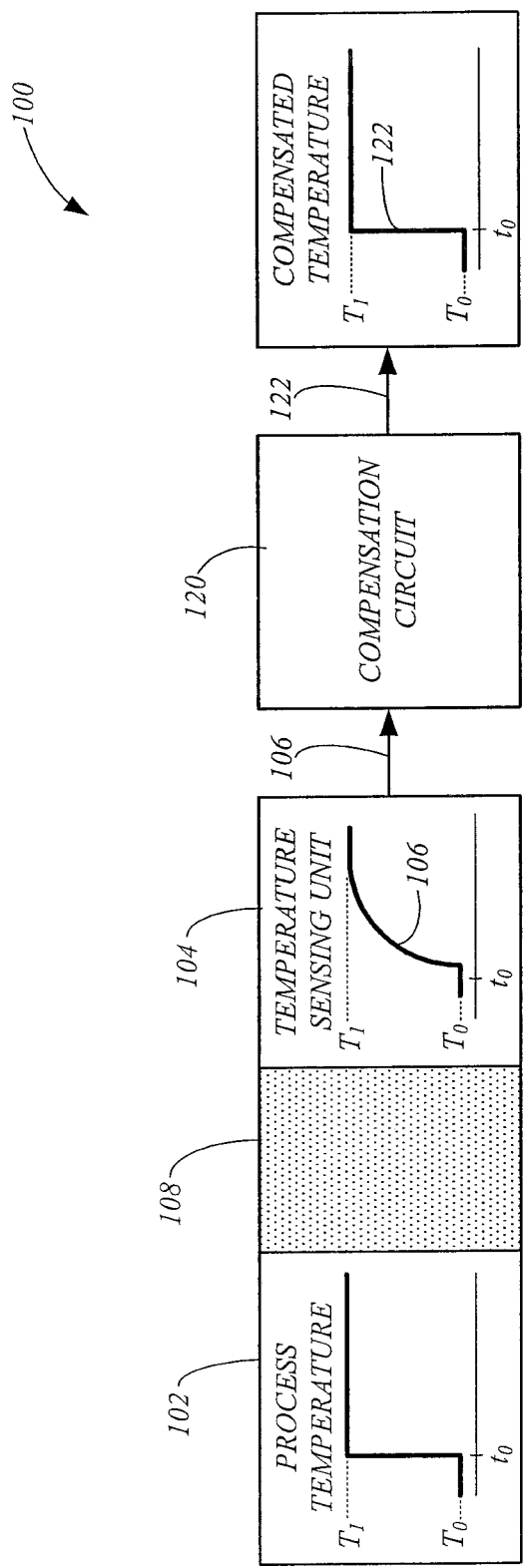
FIG. 2 is a simplified block diagram illustrating exemplary signal processing performed by a compensation circuit of an industrial process temperature transmitter, in accordance with embodiments of the present disclosure.

FIG. 2 is a simplified block diagram illustrating exemplary signal processing performed by the compensation circuit 120. For example, when a step temperature change to the process medium 102 occurs at time $t_0$, such as an increase from temp $T_0$ to temp $T_1$, as indicated in the chart within the box representing the process medium 102, a delay occurs before the temperature change is measured by the temperature sensing unit 104. This delay is indicated in the chart representing the temperature measurement indicated by the signal 106 that is presented in the box representing the temperature sensing unit 104. The response time of the temperature measurement causing the delay between the temperature indicated by the temperature signal 106 and the actual temperature of the process medium 102 is due, at least in part, to the necessity to communicate the temperature change through the isolation wall 108. Other factors may also contribute to the slow response time of the temperature measurement. The compensation circuit 120 compensates the signal 106 to substantially eliminate or reduce the response time of the temperature measurement, such that the compensated temperature signal 122 substantially matches the actual temperature of the process medium, as indicated in the box representing the compensated temperature signal 122.

The compensation circuit 120 may comprise analog circuitry and/or digital circuitry. In some embodiments, the compensation circuit 120 represents one or more processors that are configured to execute instructions, which may be stored locally in memory of the compensation circuit 120, or in memory that is remote to the transmitter 100, to perform one or more functions described herein. In some embodiments, the compensated temperature signal 122 is a digital signal, and the temperature transmitter 100 includes a digital-to-analog converter (DAC) 124 that converts the compensated temperature signal 122 to an analog compensated temperature signal 122'.

In some embodiments, the temperature transmitter 100 includes an output circuit 126 that receives the compensated temperature signal 122 and produces a temperature output 128 as a function of the compensated temperature signal 122. In some embodiments, the output circuit 126 produces the temperature output 128 in accordance with a desired data communication protocol.

Figure 3:
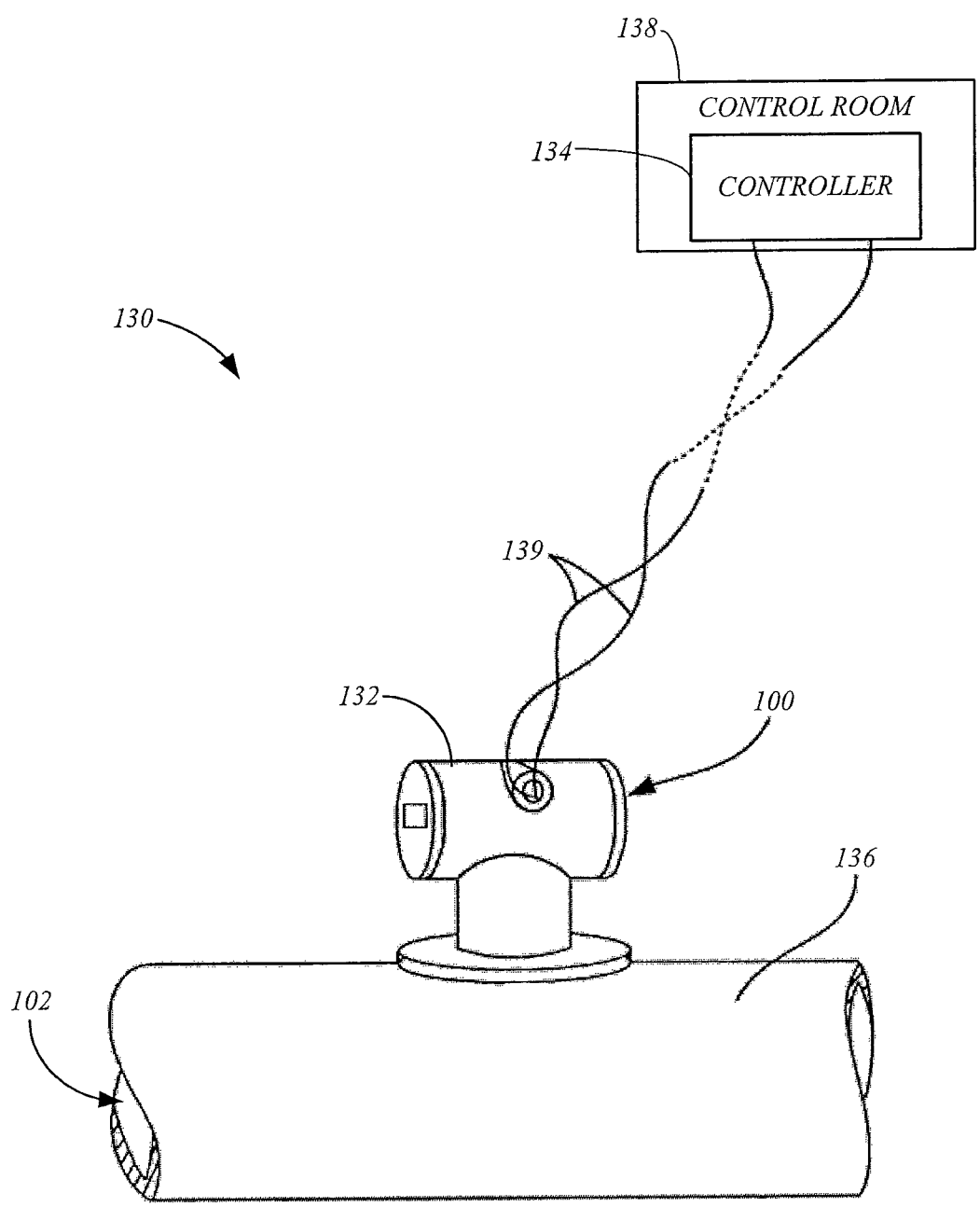
FIG. 3 is a simplified diagram showing an exemplary industrial process control system including a temperature transmitter configured to sense a temperature of a process medium, in accordance with embodiments of the present disclosure.

FIG. 3 is a simplified diagram showing an exemplary industrial process control system 130 including the temperature transmitter 100 formed in accordance with one or more embodiments described herein. In some embodiments, the transmitter 100 includes a housing 132 that may contain, for example, the compensation circuit 120, the output circuit 126, and/or other components of the transmitter described herein. In some embodiments, the output circuit 126 is configured to transmit the temperature output 128 to a suitable controller 134 that uses the temperature output 128 to control aspects of the process medium 102, such as a process fluid flowing through a process vessel 136, such as a pipe. In some embodiments, the controller 134 is located remotely from the temperature transmitter 100, such as in a remote control room 138, as shown in FIG. 3.

In some embodiments, the output circuit 126 is connected to the controller 134 over a two-wire loop 139, as illustrated in FIG. 3. In some embodiments, the two-wire loop 139 is configured to transmit all electrical power required by the temperature transmitter 100 to operate. In some embodiments, the output circuit 126 communicates the temperature output 128 over the two-wire loop 139 to the controller 134 by modulating a current flow that varies between 4-20 milliamps. Alternatively, the output circuit 126 may be configured to transmit the temperature output 128 to the controller 134 wirelessly in a point-to-point configuration, a mesh network, or other suitable configuration with the temperature transmitter 100 having its own power source.

Figure 4:
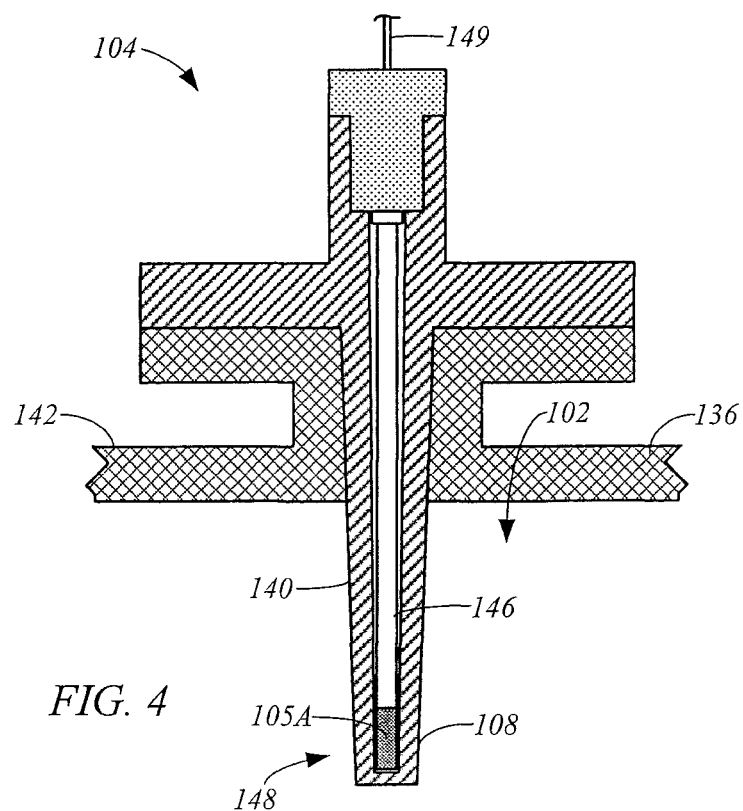
FIG. 4 is simplified cross-sectional view of a portion of a temperature sensing unit within a thermowell of a temperature transmitter, in accordance with exemplary embodiments of the present disclosure.

FIG. 4 is simplified cross-sectional view of a portion of a temperature sensing unit 104 within a thermowell 140 of a temperature transmitter 100, in accordance with exemplary embodiments of the present disclosure. The thermowell 140 includes the isolation wall 108 and encloses the temperature sensor 105A. When the transmitter 100 is installed in the field, the thermowell 140 extends through a wall 142 of a process vessel 136, such as a process pipe (shown), a tank, or other process vessel, to position the thermowell 140 within the process medium 102. In some embodiments, the temperature sensor 105A is located at a distal end of a sensor probe 146, which positions the temperature sensor 105A within a temperature sensing region 148 of the thermowell 140. One exemplary thermowell of a temperature transmitter is disclosed in U.S. Pat. No. 9,188,490, which is incorporated herein by reference in its entirety.

The isolation wall 108 of the thermowell 140 isolates the temperature sensor 104 from the process medium 102. In some embodiments, the isolation wall 108 is a cylindrical or conical wall that surrounds the temperature sensor 105A. In some embodiments, the isolation wall 108 is formed of a highly thermally conductive material, such as brass, steel, copper, or other suitably thermally conductive material. Such materials reduce the time required to communicate (i.e., conduct) the temperature of the medium 102 to the sensor 105A. The temperature signal 108 (FIG. 1) output by the temperature sensor 104 may be communicated to other components of the transmitter 100, such as the compensation circuit 110 through wires 149, for example.

Figure 5:
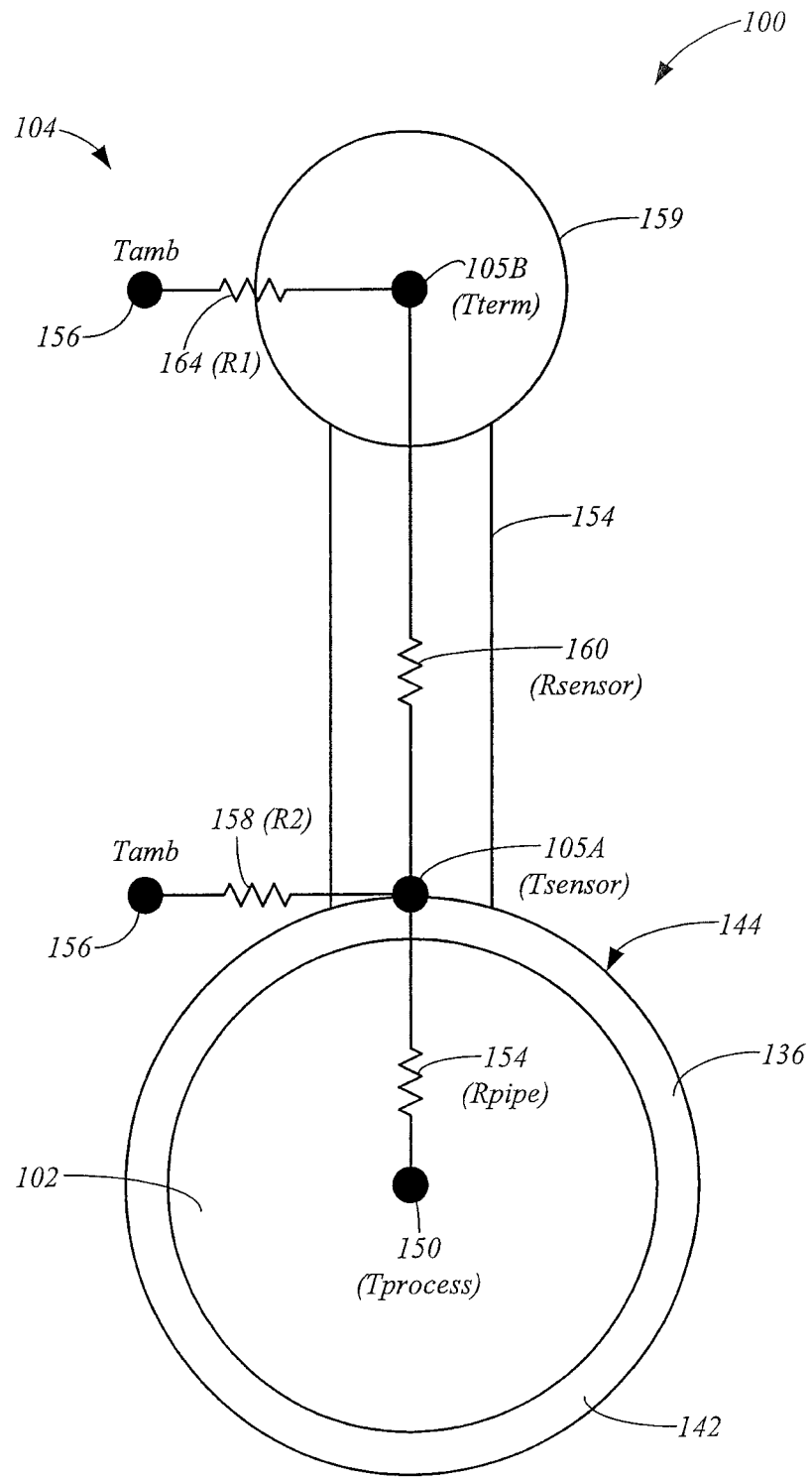
FIG. 5 is a simplified diagrammatic view of a temperature sensing unit of an exemplary nonintrusive temperature transmitter that is located externally to a process vessel, in accordance with exemplary embodiments of the present disclosure.

FIG. 5 is a diagrammatic view of a temperature sensing unit 104 of an exemplary non-intrusive temperature transmitter 100 that is located externally to the process vessel 136 (e.g., pipe, tank, etc.), in accordance with embodiments of the present disclosure. Another exemplary non-intrusive temperature transmitter is disclosed in U.S. Publication No. 2015/0185085, which is incorporated herein by reference in its entirety.

In some embodiments, the wall 142 of the process vessel 136 forms the isolation wall 108 that separates the process medium 102 from the temperature sensor 105A (Tsensor), which is placed in contact with or in close proximity to the exterior surface 144 of the wall 142, as shown in FIG. 5. The process temperature sensor 105A performs a temperature measurement of the process medium 102 through the wall 142, which is illustrated as a pipe in FIG. 5, by measuring a temperature at the exterior surface 144.

Heat flow is modeled in FIG. 5 in terms of electrical components. Specifically, the temperature of the process fluid is illustrated as node 150 and is coupled to the temperature sensor 105A via the thermal impedance (Rpipe) of the pipe 136 or wall 142 indicated diagrammatically as a resistor 154. It should be noted that the thermal impedance of the pipe 136 or wall 142 can be known either by virtue of the material of the pipe 136 itself and the thickness of the pipe wall 142 such that a suitable impedance parameter could be entered into circuitry of the unit 104, such as the compensation circuit 120. For example, a user configuring the system may indicate that the pipe 136 is constructed from stainless steel and the wall 142 is ½ inch thick. Then, suitable lookup data within memory can be accessed by the compensation circuit 120 to identify a corresponding thermal impedance that matches the selected material and wall thickness. Moreover, embodiments may be practiced where the pipe material is simply selected and the thermal impedance can be calculated based on the selected material and the selected wall thickness. Regardless, embodiments of the present disclosure generally leverage knowledge of the thermal impedance of the pipe material. Further, in embodiments where the thermal impedance of the pipe material cannot be known ahead of time, it is also possible that a calibration operation can be provided where a known process fluid temperature is provided to the non-invasive process fluid temperature calculation system and the thermal impedance is set as a calibration parameter.

As indicated in FIG. 5, heat may also flow from the temperature sensor 105A out the sidewall of stem portion 154 to the ambient environment illustrated at reference numeral 156. This is illustrated diagrammatically as thermal impedance (R2) at reference number 158. The thermal impedance (R2) to the ambient environment can be increased by thermally insulating the temperature sensor 105A.

Heat also flows from the external surface 144 of the pipe 136 through the stem portion 154 to a housing 159 or other location that is spaced from the pipe 136 via conduction through stem portion 154. The housing 159 encloses circuitry of the temperature sensing unit 104, such as the compensation circuit 120 and the output circuit 126, for example. The thermal impedance of the stem portion 154 (Rsensor) is illustrated diagrammatically at reference numeral 160. In some embodiments, the temperature sensing unit 104 includes a temperature sensor 105B (Tterm) that is coupled to a terminal block or other location within the housing 159 to measure the terminal temperature. Heat may flow from the temperature sensor 105B to the ambient environment via thermal impedance 164 (R1).

When the process fluid temperature changes, it will affect both the reading from temperature sensor 105A and the reading from terminal temperature sensor 105B since there is a rigid mechanical interconnection between them (heat conduction through stem portion 154) with relatively high thermal conductance. The same applies to the ambient temperature. When the ambient temperature changes, it will impact both of these measurements as well, but to a much lesser extent.

For slow changing conditions, the basis heat flux calculation can be simplified into:

$$T_{corrected}=T_{sensor}+(T_{sensor}-T_{terminal})*(R_{pipe}/R_{sensor}).$$

As mentioned above, embodiments of the compensation circuit 120 operate to compensate the corrected temperature (Tcorrected) indicated by the temperature signal 106 or 106', for the response time of the temperature measurement, such as the time required to communicate the temperature of the process medium 102 through the isolation wall 108 in form of the wall 142 of the pipe 136, as well as other materials, such as a sensor sheath or other material of the sensor 105A, for example. This can generally be approximated using the following first order equation, in which t is the update rate (e.g., 1 second or less) of the temperature measurement (Tcorrected), and r is the time constant of the components involved in the temperature measurement.

$$\text{Temp}_{meas}=\text{Temp}_{process}*(1-e^{-t/r}) \quad \text{Eq.1}$$

In some embodiments, the compensation circuit 120 applies dynamic compensation to the temperature measurement by knowing the time constant and trend information about the temperature measurement. The rate of change of the measurement can be evaluated over a number of samples to provide a percentage and direction of correction that minimizes sampling noise. The rate of change can be divided by the exponential portion of Equation 1 to provide the dynamic compensation to the measured temperature, as indicated in Equation 2.

$$\text{Temp}_{dynamicComp} = \frac{\text{Temp}_{meas\_ROC}}{(1-e^{-t/\tau})} \quad \text{Eq. 2}$$

A compensated temperature measurement value (Temp$_{measCompensated}$), which is represented by the compensated temperature signal 122 (FIG. 1), is calculated by adding the measured temperature value (Temp$_{meas}$) corresponding to the signal 106 or 106' from the sensing unit 104 with the dynamic compensation value (Temp$_{dynamicComp}$), as indicated in Equation 3. The time delay described above between the measured temperature (Temp$_{meas}$) and the current temperature of the medium 102 is removed or significantly reduced in the compensated temperature measurement (Temp$_{measCompensated}$), as indicated by the signal 122 in FIG. 2.

$$\text{Temp}_{measCompensated}=\text{Temp}_{meas}+\text{Temp}_{dynamicComp} \quad \text{Eq. 3}$$

Figure 6:
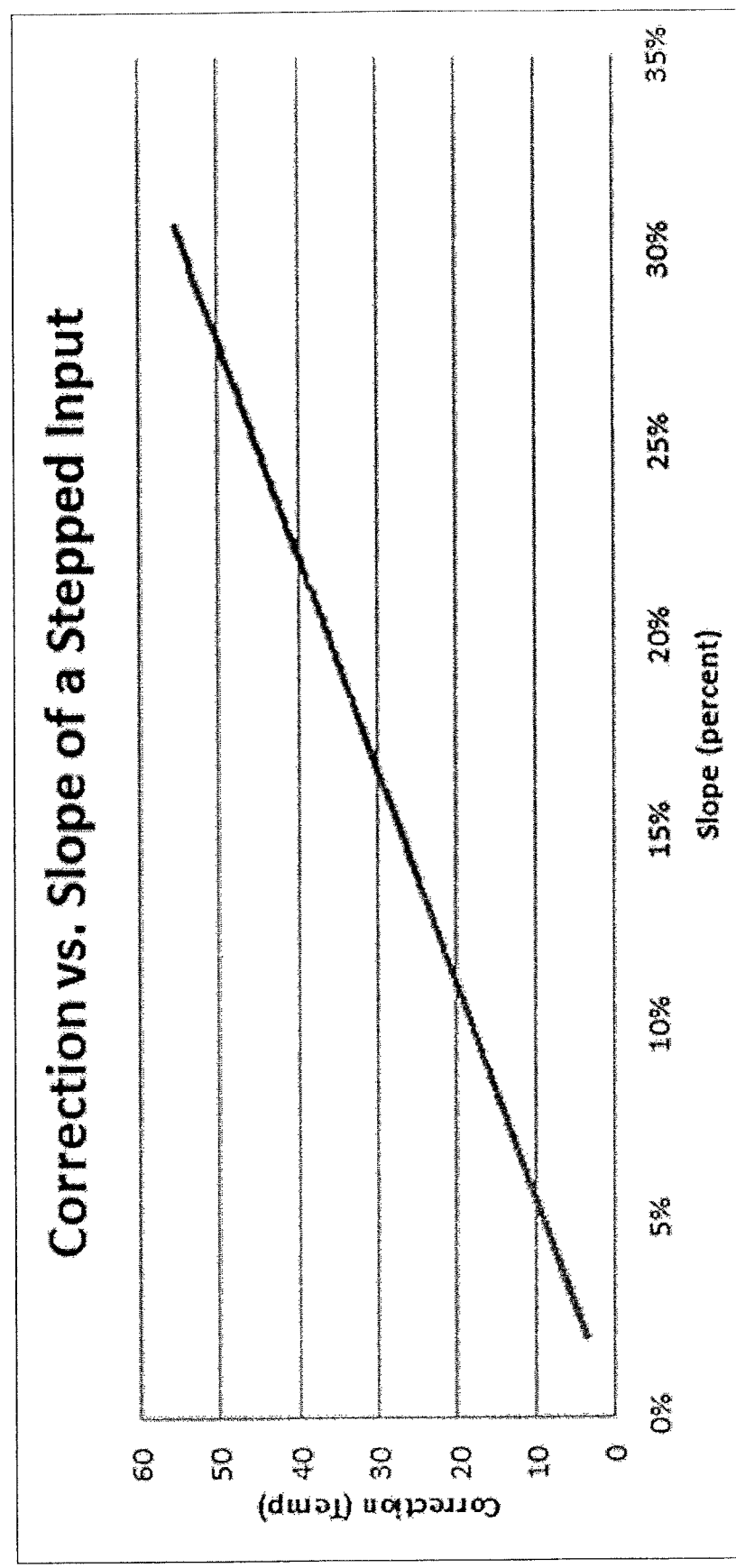
FIG. 6 is a graph illustrating an exemplary correction that should be applied to a temperature measurement in relation to the measurement rate of change for a stepped input, in accordance with embodiments of the present disclosure.

FIG. 6 is a graph illustrating the amount of correction that should be applied to a temperature measurement in relation to the measurement rate of change for a stepped input from 60° C. to 120° C. with a 3-minute time constant. As shown in FIG. 6, as the trending change in the temperature measurement is smaller, so is the necessary correction (Temp$_{dynamicComp}$).

For non-intrusive temperature transmitters 100, such as that discussed above with reference to FIG. 5, parameters of the process vessel wall 142, which forms the isolation wall 108, must be known, such as the material forming the wall 142, thickness of the wall 142, and/or other parameters of the process vessel wall 142. These can be set in the transmitter 100. In some embodiments, such parameters of the process vessel wall 142 are used to determine the time constant for the specific process vessel wall 142, through which the transmitter 100 is measuring the temperature of the process medium 102. Testing has shown that the time constant for each supported pipe material can be approximated using a linear equation for any pipe wall thickness. For example, the time constant in minutes for carbon steel can be calculated using Equation 4 below.

$$\tau_{cs}=8.042*\text{Wall}_{thickness}+1.031 \quad \text{Eq. 4}$$

Time constants for transmitters 100 utilizing a thermowell, such as the thermowell 140 described above with reference to FIG. 4, can be calculated in a similar manner to determine the amount of correction (Temp$_{dynamicComp}$) of the measured temperature (Temp$_{meas}$) that is required.

Adjustments to calculated time constants can be made if additional information is supplied, such as the type of process medium contained within the process vessel 136, the density of the process medium 102, and/or other information.

It is understood that embodiments of the present disclosure may be applied to compensate for delays in the response time of other types of temperature sensors. For example, the response time of a resistance temperature detector (RTD) used for cold junction compensation of a thermocouple may be compensated for using the techniques described above, such as when the ambient temperature changes quickly. Furthermore, as RTD's have slower response times than thermocouples, embodiments of the present disclosure may be used to speed up measurements performed by an RTD having an isolation wall in the form of an exterior wall of the RTD, for example.

In some embodiments, parameter values, such as time constants, wall thicknesses, and/or other information used by the compensation circuit 120, may be stored in memory that is accessible by the compensation circuit 120. In some embodiments, the parameter values are stored in one or more radio frequency identification (RFID's) tags. In some embodiments, such RFID tags are attached to the temperature sensor being compensated, the isolation wall (e.g., thermowell or process vessel), or other component.

Although the embodiments of the present disclosure have been described with reference to preferred embodiments, workers skilled in the art will recognize that changes may be made in form and detail without departing from the spirit and scope of the present disclosure.

What is claimed is:

1. An industrial process temperature transmitter for measuring a temperature of a process medium contained in a process vessel, the transmitter comprising:

a temperature sensing unit including:
        a process temperature sensor separated from the process medium by an isolation wall; and
        a secondary temperature sensor configured to produce a secondary temperature signal based on a sensed temperature;
        wherein the temperature sensing unit configured to produce a temperature signal that is indicative of the temperature of the process medium based on a process temperature signal output from the process temperature sensor and the secondary temperature signal during a temperature measurement;

a compensation circuit configured to provide a dynamic compensation to the temperature signal for a response time of the temperature measurement to a change in the temperature of the process medium and a rate of change of the temperature measurement, and output a compensated temperature signal;

an output circuit configured to produce a temperature output as a function of the compensated temperature signal; and a housing attached to an exterior of the process vessel and containing the secondary temperature sensor.

2. The transmitter according to claim 1, wherein:
the response time of the temperature measurement is dependent on at least one property of the isolation wall selected from the group consisting of a mass of the isolation wall, a thermal conductivity of the isolation wall, and a thickness of the isolation wall; and
the compensation circuit compensates the temperature signal and outputs the compensated temperature signal based on the at least one property of the isolation wall.

3. The transmitter according to claim 1, wherein:
the isolation wall forms a wall of the process vessel; and
the process temperature sensor is in contact with an exterior surface of the isolation wall.

4. The transmitter according to claim 3, wherein the process vessel is selected from the group consisting of a pipe and a tank.

5. The transmitter according to claim 3, wherein the secondary temperature sensor measures a terminal block temperature of the transmitter contained within the housing.

6. The transmitter according to claim 3, wherein:
the temperature sensing unit includes at least one analog-to-digital converter configured to convert the process temperature signal in an analog form into a digital process temperature signal and to convert the secondary temperature signal in an analog form into a digital secondary temperature signal;
the processing circuit produces the temperature signal in a digital form based on the digital process temperature signal and the digital secondary temperature signal; and
a digital-to-analog converter configured to convert the compensated temperature signal in a digital form to an analog compensated temperature signal;
wherein the output circuit is configured to produce the temperature output as a function of the analog compensated temperature signal.

7. The transmitter according to claim 1, comprising a thermowell including the isolation wall that extends into the process medium and defines a cavity, wherein the process temperature sensor is contained in the cavity.

8. The transmitter according to claim 1, wherein:
the temperature sensing unit includes an analog-to-digital converter configured to convert the process temperature signal in an analog form into a digital process temperature signal to produce the temperature signal in a digital form; and
a digital-to-analog converter configured to convert the compensated temperature signal in a digital form to an analog compensated temperature signal;
wherein the output circuit is configured to produce the temperature output as a function of the analog compensated temperature signal.

9. The industrial process temperature transmitter according to claim 1, wherein:
the industrial process temperature transmitter includes a stem portion having a first end attached to the process vessel and a second end displaced from the process vessel and the isolation wall;
the housing is attached to the second end of the stem portion; and
the compensation circuit compensates the temperature signal for the response time of the temperature measurement based on a thermal impedance of the stem portion.

10. The industrial process temperature transmitter according to claim 1, wherein the process temperature sensor comprises a thermistor.

11. An industrial process temperature transmitter for measuring a temperature of a process medium contained in a process vessel through an isolation wall, the transmitter comprising:
a temperature sensing unit comprising:
a process temperature sensor separated from the process medium by the isolation wall and in contact with the exterior surface of the isolation wall, the process temperature sensor configured to produce a process temperature signal based on the temperature of the process medium;
a secondary temperature sensor configured to produce a secondary temperature signal based on a temperature at a location spaced from the process medium and the isolation wall; and
processing electronics configured to produce a temperature signal that is indicative of the temperature of the process medium based on the process temperature signal and the secondary temperature signal;
a compensation circuit configured to provide a dynamic compensation to the temperature signal for a response time of the temperature measurement and a rate of change of the temperature measurement, and output a compensated temperature signal;
an output circuit configured to produce a transmitter output as a function of the compensated temperature signal;
a stem portion having a first end attached to the process vessel and a second end that is displaced from the process vessel and the isolation wall; and
a housing attached to the second end of the stem portion and containing the secondary temperature sensor.

12. The transmitter according to claim 11, wherein:
the response time of the temperature measurement is dependent on at least one property of the isolation wall selected from the group consisting of a mass of the isolation wall, a thermal conductivity of the isolation wall, and a thickness of the isolation wall; and
the compensation circuit compensates the temperature signal and produces the compensated temperature signal based on the at least one property of the isolation wall.

13. The transmitter according to claim 11, wherein the isolation wall forms a wall of the process vessel.

14. The transmitter according to claim 13, wherein the process vessel is selected from the group consisting of a pipe and a tank.

15. The transmitter according to claim 13, wherein the compensation circuit compensates the temperature signal for the response time of the temperature measurement based on a thermal impedance of the stem portion.

16. The transmitter according to claim 13, wherein:
the temperature sensing unit includes a first analog-to-digital converter configured to convert the process temperature signal in an analog form into a digital process temperature signal, and a second analog-to-digital converter configured to convert the secondary temperature signal in an analog form into a digital secondary temperature signal;

the processing circuit produces the temperature signal in a digital form based on the digital process temperature signal and the digital secondary temperature signal; and a digital-to-analog converter configured to convert the compensated temperature signal in a digital form to an analog compensated temperature signal;

wherein the output circuit is configured to produce the temperature output as a function of the analog compensated temperature signal.

17. A method for measuring a temperature of a process medium using an industrial process temperature transmitter, the method comprising:

performing a temperature measurement of the temperature of a process medium using a temperature sensing unit including:

sensing the temperature of the process medium through an isolation wall using a process temperature sensor comprising a thermistor; and sensing a temperature of a terminal block of the transmitter using a secondary temperature sensor;

producing a temperature signal in response to the temperature measurement comprising processing a process temperature signal from the process temperature sensor and a secondary temperature signal from the secondary temperature sensor;

dynamically compensating the temperature signal for a response time of the temperature measurement and a rate of change of the temperature measurement, using a compensation circuit;

generating a compensated temperature signal, in which the response time of the temperature measurement is reduced or eliminated, using the compensation circuit; and producing a temperature output as a function of the compensated temperature signal using an output circuit.

18. The method according to claim 17, wherein compensating the temperature signal comprises compensating the temperature signal based on at least one property of the isolation wall selected from the group consisting of a mass of the isolation wall, a thermal conductivity of the isolation wall, and a thickness of the isolation wall.

19. The method according to claim 17, wherein:

the isolation wall forms a wall of a process vessel that contains the process medium; and performing a temperature measurement comprises contacting an exterior surface of the isolation wall with the process temperature sensor.

20. The method according to claim 17, wherein:

the isolation wall defines a portion of a cavity of a thermowell that extends into the process medium, the cavity containing the process temperature sensor; and performing the temperature measurement comprises sensing the temperature of the process medium through the isolation wall of the thermowell using the process temperature sensor.

* * * * *